United States Patent
Morozumi et al.

(10) Patent No.: US 11,349,132 B2
(45) Date of Patent: May 31, 2022

(54) FUEL CELL SEPARATOR AND METHOD FOR MANUFACTURING FUEL CELL SEPARATOR

(71) Applicant: TOYOTA SHATAI KABUSHIKI KAISHA, Kariya (JP)

(72) Inventors: Eiichiro Morozumi, Kariya (JP); Takayuki Suzuki, Kariya (JP); Michi Hashiba, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 17/043,611

(22) PCT Filed: Mar. 5, 2019

(86) PCT No.: PCT/JP2019/008714
§ 371 (c)(1),
(2) Date: Sep. 29, 2020

(87) PCT Pub. No.: WO2019/225114
PCT Pub. Date: Nov. 28, 2019

(65) Prior Publication Data
US 2021/0408558 A1   Dec. 30, 2021

(30) Foreign Application Priority Data

May 23, 2018 (JP) .............................. JP2018-098726

(51) Int. Cl.
*H01M 8/0228* (2016.01)
*H01M 8/0206* (2016.01)
(Continued)

(52) U.S. Cl.
CPC ....... *H01M 8/0228* (2013.01); *H01M 8/0206* (2013.01); *H01M 8/0221* (2013.01); *H01M 8/0254* (2013.01)

(58) Field of Classification Search
CPC .................................................... H01M 8/0228
See application file for complete search history.

(56) References Cited

U.S. PATENT DOCUMENTS

| 2004/0106032 A1* | 6/2004 | Uejima | H01M 8/0228 |
| | | | 429/517 |
| 2005/0031933 A1 | 2/2005 | Blunk et al. | |

(Continued)

FOREIGN PATENT DOCUMENTS

| EP | 1009051 A2 | 6/2000 |
| JP | 2000-173631 A | 6/2000 |

(Continued)

*Primary Examiner* — Brian R Ohara
(74) *Attorney, Agent, or Firm* — Maschoff Brennan

(57) ABSTRACT

A separator includes a base material made of metal plate and a first layer made of corrosion-resistant material and arranged on the entirety of one surface of the base material. The base material includes extending projections and extending recesses. The projections and the recesses are alternately arranged. The separator includes a second layer including a conductive particle and a binder that is made of plastic material, the second layer being arranged only on a part of a surface of the first layer corresponding to a top surface of the projections of the base material. The conductive particle is contained only in the second layer.

5 Claims, 3 Drawing Sheets

(51) Int. Cl.
*H01M 8/0221* (2016.01)
*H01M 8/0254* (2016.01)

(56) References Cited

U.S. PATENT DOCUMENTS

| | | | |
|---|---|---|---|
| 2005/0252892 A1 | 11/2005 | Newman et al. | |
| 2007/0238005 A1* | 10/2007 | Yagi .................... | H01M 8/0213 |
| | | | 429/509 |
| 2008/0026279 A1* | 1/2008 | Kobuchi ............. | H01M 8/0258 |
| | | | 429/482 |
| 2015/0140204 A1 | 5/2015 | Suzuki et al. | |
| 2017/0263949 A1 | 9/2017 | Morozumi et al. | |
| 2018/0006924 A1 | 3/2018 | Suzuki et al. | |
| 2018/0069248 A1* | 3/2018 | Suzuki ................ | H01M 8/0254 |
| 2018/0097243 A1 | 4/2018 | Suzuki et al. | |

FOREIGN PATENT DOCUMENTS

| | | | | |
|---|---|---|---|---|
| JP | 2007-501500 A | 1/2007 | | |
| JP | 2007-537574 A | 12/2007 | | |
| JP | 2012-227036 A | 11/2012 | | |
| JP | 5930036 B2 | 6/2016 | | |
| JP | 2018-056048 A | 4/2018 | | |
| WO | 2016/042961 A1 | 3/2016 | | |
| WO | 2014/010491 A1 | 6/2016 | | |
| WO | WO-2017038165 A1 * | 3/2017 | .......... | H01M 8/0228 |
| WO | 2017/038165 A1 | 2/2018 | | |
| WO | 2017038165 A1 | 2/2018 | | |

\* cited by examiner

FUEL CELL SEPARATOR AND METHOD FOR MANUFACTURING FUEL CELL SEPARATOR

BACKGROUND OF THE INVENTION

The present disclosure relates to a fuel cell separator and a method for manufacturing the fuel cell separator.

A solid polymer fuel cell includes a single cell. The single cell includes a membrane electrode assembly, two gas diffusion layers provided on opposite surfaces of the membrane electrode assembly, and two separators that hold the two gas diffusion layers. Each separator has a corrugated shape. Each gas diffusion layer is made of carbon fiber. A gas passage to which fuel gas and oxidizing gas are supplied is arranged between each separator and each gas diffusion layer. The surface of the base material of such a separator opposed to the gas diffusion layer is provided with a corrosion-resistant, conductive coated film to improve the corrosion-resistant properties of the separator and reduce the contact resistance between the separator and the gas diffusion layer (refer to, for example, Patent Document 1). Patent Document 1 describes a separator including a first layer including first conductive particles and plastic material and a second layer including second conductive particles. The first layer is provided on the entire surface of a base material. The second layer is provided only on the top surface of the projection of the base material.

PRIOR ART DOCUMENTS

Patent Documents

Patent Document 1: Japanese Patent No. 5930036

SUMMARY OF THE INVENTION

In the separator described in Patent Document 1, the first layer including the first conductive particles and plastic material is provided on the entire surface of the base material. In this case, the part of the surface of the first layer that is not provided with the second layer may have the following inconvenience. That is, when the plastic material has a small thickness, part of the first conductive particles may easily be exposed from the plastic material and the corrosion of the exposed part of the first conductive particles may produce a failure in the first layer and may corrode the base material. When the plastic material has a large thickness, a redundant plastic material may produce burrs to narrow the gas passage and an increase in the thickness of the separator may cause an increase in the thickness of the entire fuel cell stack. Such inconvenience may lower the performance of a fuel cell.

It is an object of the present disclosure to provide a fuel cell separator and a method for manufacturing the fuel cell separator capable of limiting a decrease in the performance of a fuel cell.

A fuel cell separator that achieves the above-described object includes a base material made of metal plate, the base material including extending projections and extending recesses, the projections and the recesses being alternately arranged, a first layer made of corrosion-resistant material and arranged on an entirety of one surface of the base material, and a second layer including a conductive particle and a binder that is made of plastic material, the second layer being arranged only on a part of a surface of the first layer corresponding to a top surface of the projections of the base material. The conductive particle is contained only in the second layer.

In the above-described structure, the entirety of one surface of the base material is provided with the first layer, which is made of corrosion-resistant material. Thus, when the separator is arranged such that the surface provided with the first layer is opposed to the gas diffusion layer, one surface of the base material is not exposed to the gas passage. The first layer does not contain the conductive particles. This prevents the elution of metal ions from the surface of the base material.

In addition, the second layer is arranged on the part of the surface of the first layer corresponding to the top surface of the projections in contact with the gas diffusion layer. The second layer contains the conductive particles. Thus, the conductive particles lower the contact resistance between the separator and the gas diffusion layer.

Accordingly, a decrease in the performance of the fuel cell is limited.

It is preferred that the above-described fuel cell separator include a third layer including a graphite particle and a binder that is made of plastic material, the third layer being arranged only on a surface of the second layer.

In the above-described structure, the third layer containing the graphite particles is arranged only on the surface of the second layer. Thus, the contact of the conductive particles of the second layer with the graphite particles of the third layer facilitates the formation of a conductive passage continuous with the gas diffusion layer with the base material, the first layer, the second layer, and the third layer in between. Additionally, the graphite particles and the gas diffusion layer, which is made of carbon fiber, are made of carbon-based material having the same properties. This limits an increase in the contact resistance between the third layer and the gas diffusion layer.

Further, a method for manufacturing a fuel cell separator that achieves the above-described object presses a base material made of metal plate to alternately form extending projections and extending recesses on the base material. The method includes a pressing step that presses the base material to form the projections and the recesses, a first layer formation step that forms a first layer on an entirety of one surface of the base material, the first layer being made of corrosion-resistant material, and a second layer formation step that forms a second layer only on a part of a surface of the first layer corresponding to a top surface of the projections of the base material, the second layer including a conductive particle and a binder that is made of plastic material. The conductive particle is contained only in the second layer.

It is preferred that the above-described method include a third layer formation step that forms a third layer only on a surface of the second layer, the third layer including a graphite particle and a binder that is made of plastic material.

Using these methods, the operational advantages similar to those of the above-described fuel cell separator are gained.

In the above-described method, it is preferred that the first layer be made of lubricating material and the first layer formation step be performed prior to the pressing step.

In such a method, the pressing step is performed to press the base material, which is provided with the first layer only on one surface. Since the first layer made of lubricating material is located between the mold and the base material, the friction resistance decreases during the pressing of the base material. This reduces the amount of lubricant used in the pressing step or eliminates the need of lubricant.

The above-described fuel cell separator and the method for manufacturing the fuel cell separator limit a decrease in the performance of a fuel cell.

DETAILED DESCRIPTION OF THE PREFERRED EMBODIMENTS

A fuel cell separator according to an embodiment will now be described with reference to FIGS. 1 to 5.

Figure 1:
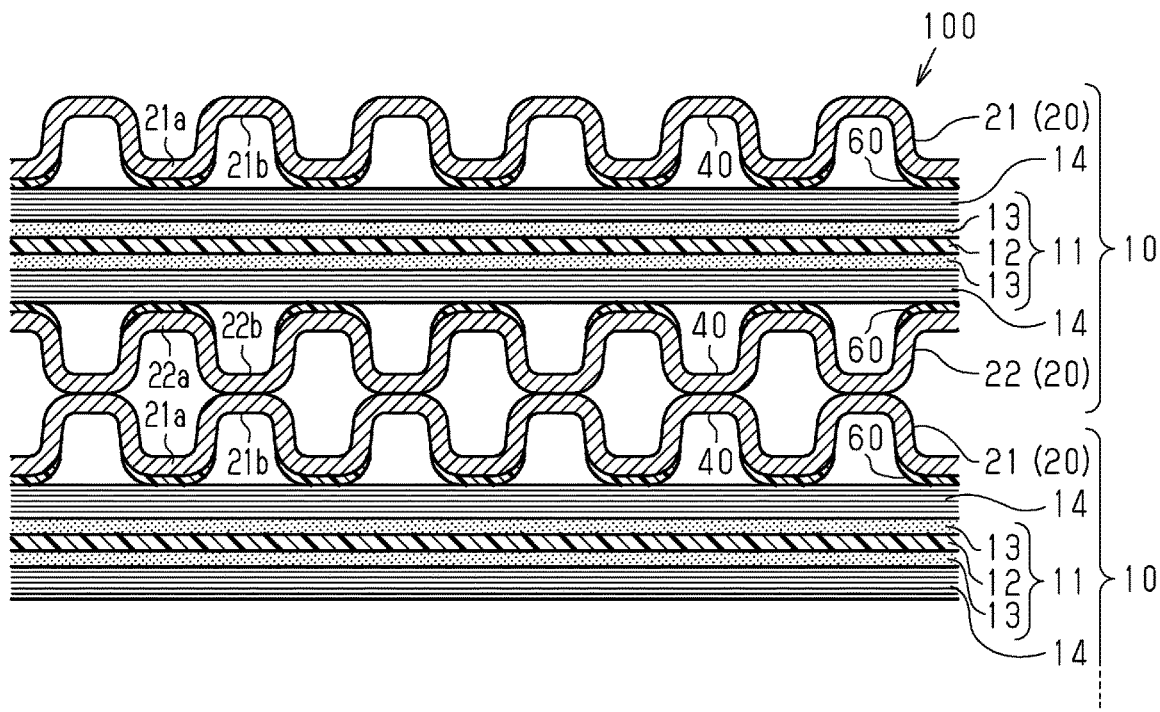
FIG. 1 is an enlarged cross-sectional view of a fuel cell stack mainly showing a single cell that includes a separator in a fuel cell separator according to an embodiment.

As shown in FIG. 1, the fuel cell separator of the present embodiment is used for a stack 100 of a solid polymer fuel cell. A separator 20 is a collective term for two separators 21 and 22, which will be described later.

The stack 100 includes a structure in which single cells 10 are stacked. Each single cell 10 includes a membrane electrode assembly 11, the two separators 21 and 22, which hold the membrane electrode assembly 11, and a gas diffusion layer 14, which is arranged between the membrane electrode assembly 11 and each of the separators 21 and 22. Each of the separators 21 and 22 has a corrugated shape. Each gas diffusion layer 14 is made of carbon fiber. The membrane electrode assembly 11 includes an electrolyte membrane 12, which is an ion-exchange membrane, and two catalytic electrode layers 13, which hold the electrolyte membrane 12.

The separator 21 includes first projections 21a and first recesses 21b, which are alternately arranged. The separator 22 includes second projections 22a and second recesses 22b, which are alternately arranged. Each of the projections 21a and 22a and each of the recesses 21b and 22b extend in the direction that is orthogonal to the sheet of FIG. 1. The top surfaces of the projections 21a and 22a of the separators 21 and 22 are opposed to the gas diffusion layers 14. The section defined by each one of the first recesses 21b of the separator 21 and the gas diffusion layer 14 configures a gas passage through which fuel gas such as hydrogen flows. The section defined by each one of the second recesses 22b of the separator 22 and the gas diffusion layer 14 configures a gas passage through which oxidizing gas such as air flows.

As shown in FIG. 1, the bottom of each one of the first recesses 21b of the separator 21 is in contact with the bottom of the corresponding one of the second recesses 22b of the separator 22, which is adjacent to the separator 21. The section defined by the rear surface of each one of the first projections 21a of the separator 21 and the corresponding one of the second projections 22a of the separator 22, which is adjacent to the separator 21, configures a cooling passage through which coolant flows.

Figure 2:
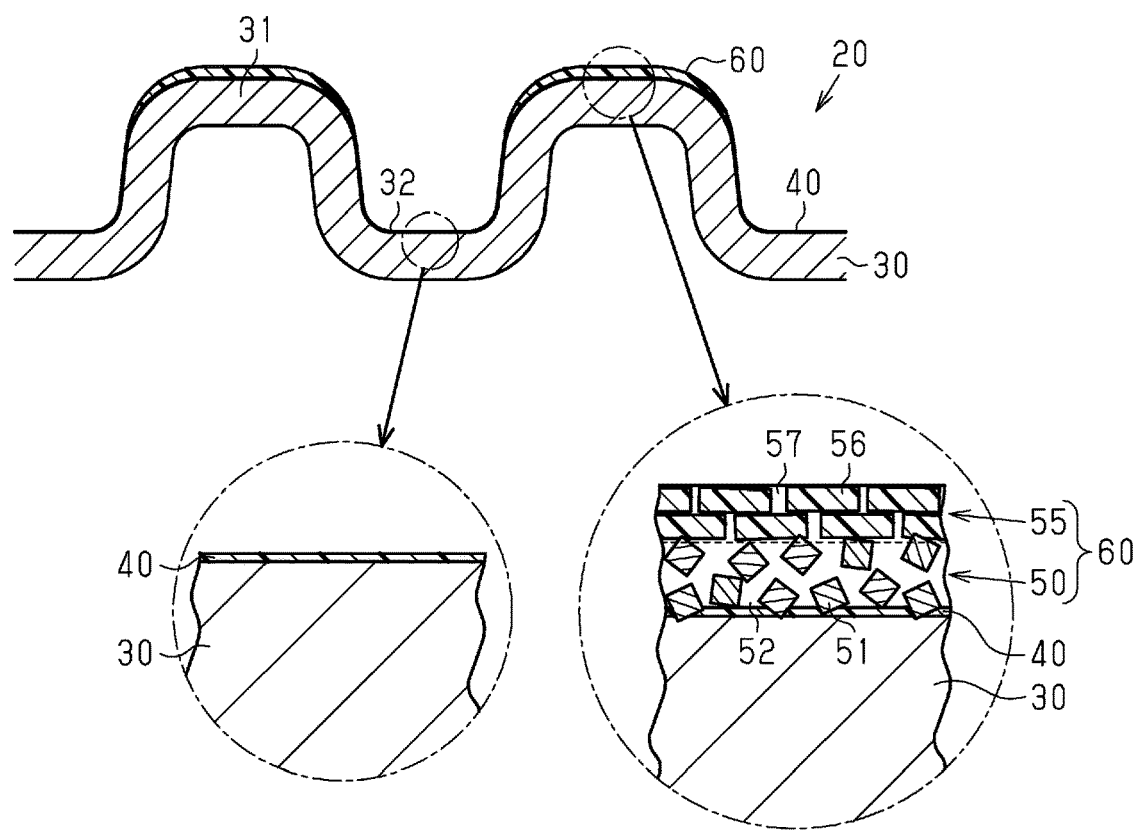
FIG. 2 is a cross-sectional view showing the structure of the fuel cell separator of the embodiment.

As shown in FIG. 2, the separator 20 includes, for example, a base material made of metal plate such as stainless steel. The base material includes projections 31 and recesses 32. In the base material, the projections 31 and the recesses 32 are alternately arranged. The projections 31 correspond to the projections 21a and 22a of the two separators 21 and 22. The recesses 32 correspond to the recesses 21b and 22b of the two separators 21 and 22. The entirety of one surface (the upper surface in FIG. 2) of the base material 30 is provided with a first layer 40. The part of the surface of the first layer 40 corresponding to the top surface of each projection 31 is provided with a conductive layer 60.

The first layer 40 is, for example, a thin layer made of thermosetting plastic material with corrosion resistance and lubricity. In the present embodiment, the first layer 40 is made of phenol plastic and has a thickness of, for example, 1 μm.

The conductive layer 60 includes a second layer 50, which is arranged on the surface of the first layer 40, and a third layer 55, which is arranged on the second layer 50. In the present embodiment, the conductive layer 60 has a thickness of, for example, 20 to 25 μm.

The second layer 50 includes conductive particles 51, which are made of titanium nitride, and a first binder 52, which is made of epoxy plastic. The first layer 40 has a thickness that is smaller than the maximum agglomerated particle diameter of the conductive particles 51. The maximum agglomerated particle diameter refers to the maximum diameter of a cluster of multiple conductive particles 51 brought into contact with each other without solvent or plastic in between.

The third layer 55 includes graphite particles 56 and a second binder 57, which is made of polyvinylidene difluoride (PVDF) plastic.

The conductive particles 51 extend through the first layer 40, which is arranged on the surface of the base material 30, and is in contact with the base material 30. The conductive particles 51 and the graphite particles 56 are in contact with each other. Polyvinylidene difluoride is a thermoplastic, and epoxy plastic is thermosetting plastic. Epoxy plastic has a thermosetting temperature that is lower than the melting point of polyvinylidene difluoride.

A method for manufacturing the fuel cell separator will now be described.

Figure 3:
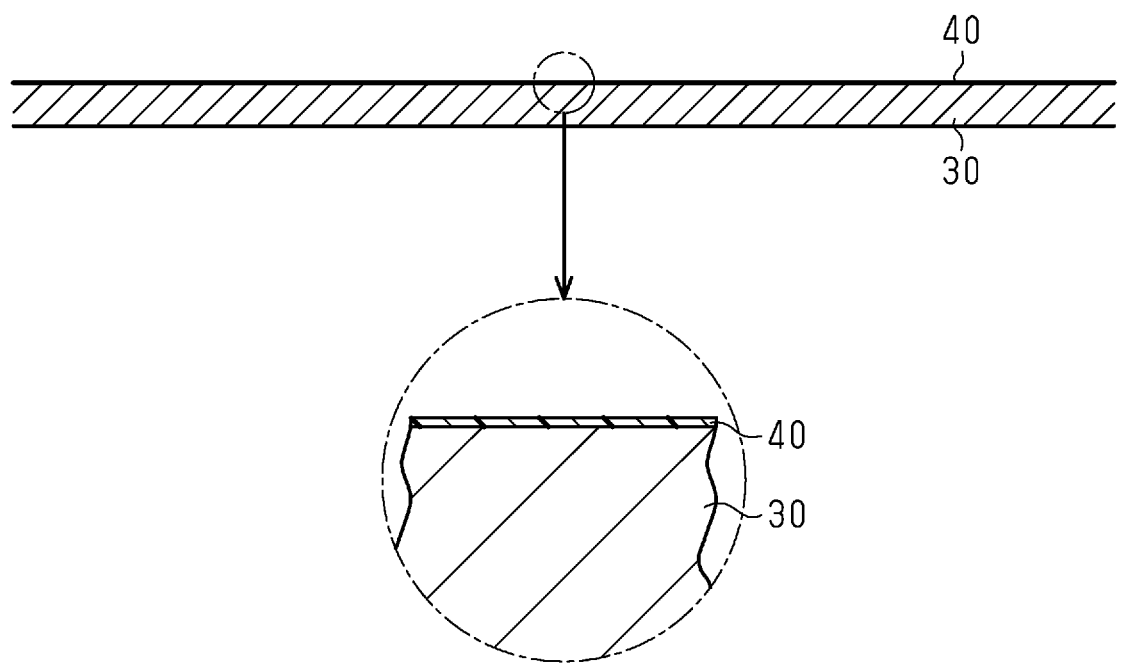
FIG. 3 is a cross-sectional view showing the base material subsequent to a first layer formation step in the embodiment.

First, as shown in FIG. 3, a coating apparatus is used to apply phenol plastic to the entirety of one surface of the base material 30 so that the first layer 40 is formed (first layer formation step).

Figure 4:
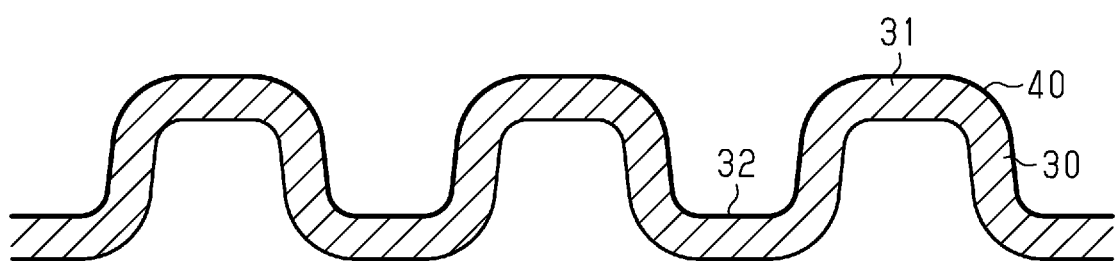
FIG. 4 is a cross-sectional view showing the base material subsequent to a pressing step in the embodiment.

Next, as shown in FIG. 4, the base material 30 provided with the first layer 40 is pressed by a mold (not shown) so that the projections 31 and the recesses 32 are alternately arranged (pressing step).

Figure 5:
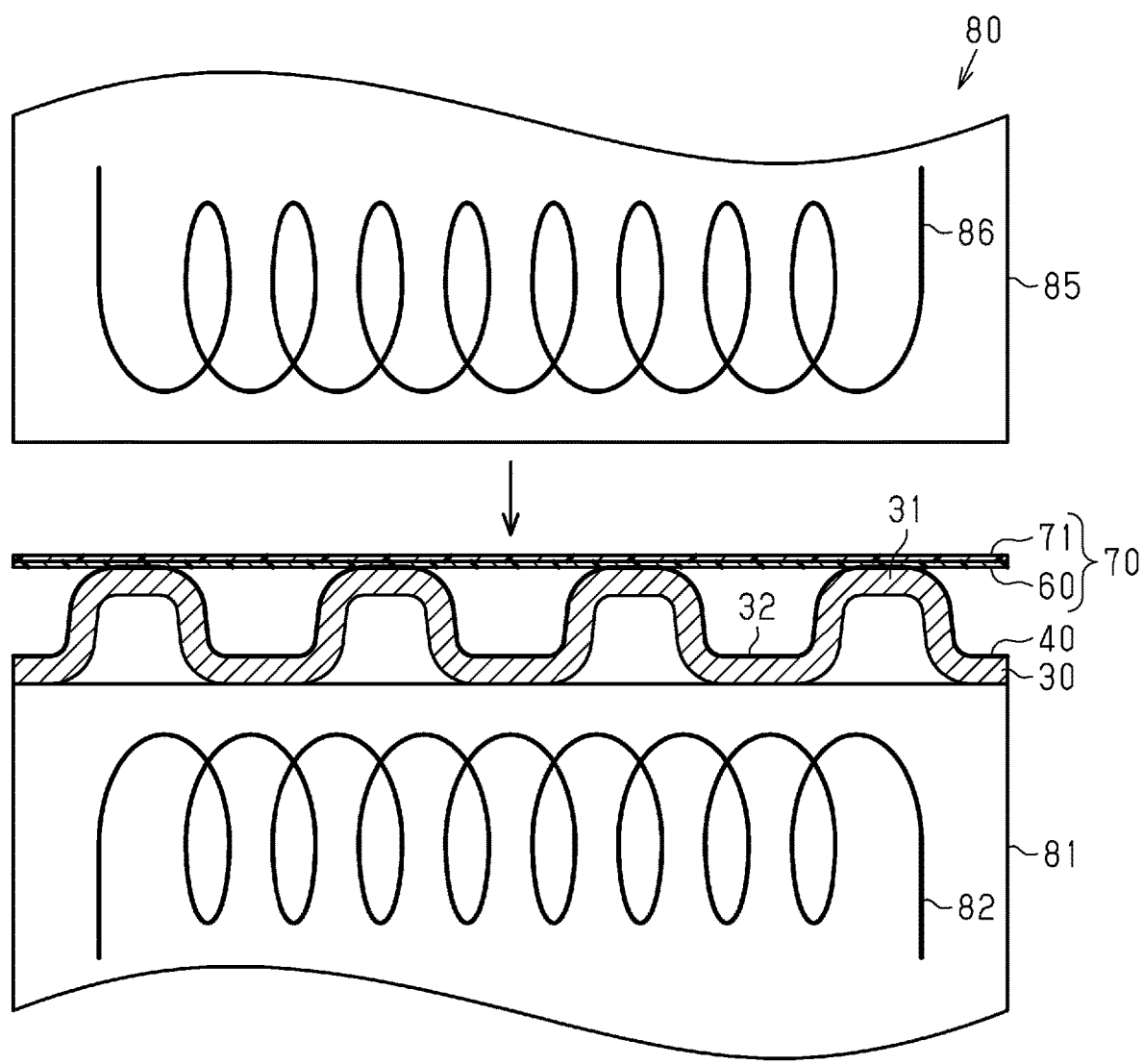
FIG. 5 is a cross-sectional view illustrating a second layer formation step and a third layer formation step in the embodiment.

Subsequently, as shown in FIG. 5, the base material 30 is mounted on a fixed die 81 of a thermal-transfer apparatus 80 such that the first layer 40 is upwardly directed. Then, a thermal-transfer film 70 is mounted on the projections 31 of the base material 30. The thermal-transfer film 70 includes, for example, a base film 71, which is made of polyethylene terephthalate or the like, and the conductive layer 60, which is applied to one surface of the base film 71.

Afterwards, the fixed die 81 and a movable die 85 are used to pressurize the base material 30 and the thermal-transfer film 70. This causes the conductive particles 51 of the second layer 50 to extend through the first layer 40 and contact the base material 30 (refer to FIG. 2).

Then, electrically-heated wires 82 and 86, which are respectively arranged in the fixed die 81 and the movable die 85, are energized so that the base material 30 is heated to a predetermined temperature that is higher than the thermosetting temperature of epoxy plastic. This thermally transfers the conductive layer 60 to the projections 31 of the base material 30 (second layer formation step and third layer formation step).

The separator 20 is manufactured in this manner.

The operation and advantages of the present embodiment will now be described.

(1) The separator 20 includes the base material 30, which is made of metal plate, and the first layer 40, which is made of corrosion-resistant material and arranged on the entirety of one surface of the base material 30. The base material 30 includes the extending projections 31 and the extending recesses 32. The projections 31 and the recesses 32 are alternately arranged. The separator 20 further includes the second layer 50, which includes the conductive particles 51 and the first binder 52 made of plastic material. The second layer 50 is arranged only on the part of the surface of the first layer 40 corresponding to the top surface of the projections 31 of the base material 30. The conductive particles 51 are contained only in the second layer 50. The third layer 55, which includes the graphite particles 56 and the second binder 57 made of plastic material, is arranged only on the surface of the second layer 50.

In this structure, the entirety of one surface of the base material 30 is provided with the first layer 40, which is made of corrosion-resistant material. Thus, when the separator 20 is arranged such that the surface provided with the first layer 40 is opposed to the gas diffusion layer 14, one surface of the base material 30 is not exposed to the gas passage. The first layer 40 does not contain the conductive particles 51. This prevents the elution of metal ions from the surface of the base material 30.

In addition, the second layer 50 is arranged on the part of the surface of the first layer 40 corresponding to the top surface of the projection 31 in contact with the gas diffusion layer 14. The surface of the second layer 50 is provided with the third layer 55. The second layer 50 contains the conductive particles 51. Thus, the contact of the conductive particles 51 with the base material 30 and the graphite particles 56 facilitates the formation of a conductive passage continuous with the gas diffusion layer 14 with the base material 30, the first layer 40, the second layer 50, and the third layer 55 in between. This lowers the contact resistance between the separator 20 and the gas diffusion layer 14. Additionally, the graphite particles 56 of the third layer 55 and the gas diffusion layer 14, which is made of carbon fiber, are made of carbon-based material having the same properties. This limits an increase in the contact resistance between the third layer 55 and the gas diffusion layer 14. Accordingly, a decrease in the performance of the fuel cell is limited.

(2) The first layer 40 has a thickness that is smaller than the maximum agglomerated particle diameter of the conductive particles 51.

In such a structure, during the formation of the second layer 50, a part of the conductive particles 51 easily extends through the first layer 40 to reach the base material 30 and another part of the conductive particles 51 is exposed from the first layer 40 to easily contact the graphite particles 56. This facilitates the formation of a conductive passage between the base material 30 and the graphite particles 56 of the third layer 55 with the conductive particles 51 in between.

(3) The method for manufacturing the separator 20 includes the pressing step, which presses the base material 30 to form the projections 31 and the recesses 32, and the first layer formation step, which forms the first layer 40 made of corrosion-resistant material on the entirety of one surface of the base material 30. The manufacturing method also includes the second layer formation step. In this step, the second layer 50, which includes the conductive particles 51 and the first binder 52 made of plastic material, is formed on the part of the surface of the first layer 40 corresponding to the top surface of the projections 31 of the base material 30. The conductive particles 51 are contained only in the second layer 50. The manufacturing method further includes the third layer formation step. In this step, the third layer 55, which includes the graphite particles 56 and the second binder 57 made of plastic material, is formed on the surface of the second layer 50.

Such a method has an operational advantage similar to the above-described operational advantage (1).

(4) The pressing step is performed for the base material 30, which is provided with the first layer 40 made of lubricating material.

In such a method, the pressing step is performed to press the base material 30, which is provided with the first layer 40 on one surface. Since the first layer 40 made of lubricating material is located between the mold and the base material 30, the friction resistance decreases during the pressing of the base material 30. This reduces the amount of lubricant used in the pressing step or eliminates the need of lubricant.

The present embodiment may be modified as follows. The present embodiment and the following modifications can be combined as long as the combined modifications remain technically consistent with each other.

In the present embodiment, the first layer formation step is performed prior to the pressing step. Instead, the first layer formation step may be performed subsequent to the pressing step. In this case, the first layer 40 simply needs to be formed on the base material 30 through, for example, spray painting.

In the third layer 55, in addition to or instead of the graphite particles 56, another type of conductive particles such as carbon black may be used.

Instead of titanium nitride of the conductive particles 51 of the second layer 50, another type of conductive particles such as titanium carbide or titanium boride may be used.

The first layer 40, the second layer 50, and the third layer 55 may be provided on the opposite surfaces of the base material 30.

The material of the first layer 40 is not limited to phenol plastic. Instead, for example, the material of the first layer 40 may be the same epoxy plastic as the first binder 52 of the second layer 50 or another type of thermosetting plastic. Alternatively, the material of the first layer 40 may be thermoplastic material such as polyethylene terephthalate or polytetrafluoroethylene. As another option, the first layer may be provided using a carbon layer including diamond-like carbon (DLC) or a conductive ceramic layer.

The material of the base material 30 may be changed to another type of metal material other than stainless steel. Examples of such metal material include aluminum alloy, magnesium alloy, and titanium alloy.

DESCRIPTION OF THE REFERENCE NUMERALS

10) Single Cell; 11) Membrane Electrode Assembly; 12) Electrolyte Film; 13) Catalytic Electrode Layer; 14) Gas Diffusion Layer; 20) Separator; 21) Separator; 21a) First Projection; 21b) First Recess; 22) Separator; 22a) Second Projection; 22b) Second Recess; 30) Base Material; 31)

Projection; 32) Recess; 40) First Layer; 50) Second Layer; 51) Conductive Particle; 52) First Binder; 55) Third Layer; 56) Graphite Particle; 57) Second Binder; 60) Conductive Layer; 70) Thermal-Transfer Film; 71) Base Film; 80) Thermal-Transfer Apparatus; 81) Fixed Die; 82) Electrically-Heated Wire; 85) Movable Die; 86) Electrically-Heated Wire; 100) Stack

The invention claimed is:

1. A fuel cell separator comprising:
   a base material made of metal plate, the base material including extending projections and extending recesses, the projections and the recesses being alternately arranged;
   a first layer made of thermosetting plastic material with corrosion resistance and lubricity and arranged on an entirety of one surface of the base material; and
   a second layer including a plurality of conductive particles and a binder that is made of plastic material, the second layer being arranged only on a part of a surface of the first layer corresponding to a top surface of the projections of the base material,
   wherein a majority of each of the plurality of particles is contained in the second layer and wherein a portion of the plurality of conductive particles extend through the first layer and are in contact with the base material.

2. The fuel cell separator according to claim 1, comprising a third layer including a graphite particle and a binder that is made of plastic material, the third layer being arranged only on a surface of the second layer.

3. The fuel cell separator according to claim 1, wherein the thermosetting plastic material of the first layer forms a matrix material that is non-conductive.

4. The fuel cell separator according to claim 3, wherein the portion of the plurality of conductive particles extend through the non-conductive matrix material of the first layer.

5. The fuel cell separator according to claim 4, wherein the non-conductive matrix material only has the conductive particles extending therethrough as a conductive material therein.

* * * * *